United States Patent
Yamauchi et al.

(10) Patent No.: US 9,074,629 B2
(45) Date of Patent: Jul. 7, 2015

(54) MULTI-LAYER SLIDE MEMBER

(71) Applicant: DAIDO METAL COMPANY LTD., Aichi (JP)

(72) Inventors: Takayoshi Yamauchi, Aichi (JP); Kentaro Tsujimoto, Aichi (JP)

(73) Assignee: DAIDO METAL COMPANY LTD., Nagoya-Shi, Aichi (JP)

( * ) Notice: Subject to any disclaimer, the term of this patent is extended or adjusted under 35 U.S.C. 154(b) by 0 days.

(21) Appl. No.: 14/082,386

(22) Filed: Nov. 18, 2013

(65) Prior Publication Data

US 2014/0141282 A1 May 22, 2014

(30) Foreign Application Priority Data

Nov. 16, 2012 (JP) ................... 2012-251904

(51) Int. Cl.

| | |
|---|---|
| H01F 3/00 | (2006.01) |
| F16C 33/24 | (2006.01) |
| F16C 33/20 | (2006.01) |
| B22F 5/00 | (2006.01) |
| B32B 5/16 | (2006.01) |
| B22F 3/10 | (2006.01) |
| B32B 15/18 | (2006.01) |
| F16C 33/12 | (2006.01) |

(52) U.S. Cl.

CPC ......... *F16C 33/24* (2013.01); *Y10T 428/12972* (2015.01); *B22F 5/008* (2013.01); *B32B 5/16* (2013.01); *B22F 3/1028* (2013.01); *B32B 15/18* (2013.01); *B22F 2303/15* (2013.01); *F16C 33/128* (2013.01); *F16C 2204/10* (2013.01); *F16C 33/206* (2013.01); *F16C 2204/12* (2013.01); *F16C 2204/18* (2013.01)

(58) Field of Classification Search
None
See application file for complete search history.

(56) References Cited

U.S. PATENT DOCUMENTS

| 5,938,864 A | 8/1999 | Tomikawa et al. |
| 6,165,246 A | 12/2000 | Kira |
| 2001/0019779 A1 | 9/2001 | Sakai et al. |
| 2003/0173000 A1* | 9/2003 | Sakai et al. ................... 148/433 |
| 2010/0111753 A1* | 5/2010 | Yoshitome et al. ........... 420/470 |
| 2013/0189150 A1 | 7/2013 | Ishii et al. |

FOREIGN PATENT DOCUMENTS

| JP | 08-053725 | * | 2/1996 | ................ C22C 9/04 |
| JP | H0853725 A | | 2/1996 | |
| JP | 2001220630 A | | 8/2001 | |
| JP | 2006200024 A | | 8/2006 | |
| JP | 2006226299 A | | 8/2006 | |
| JP | 201180525 A | | 4/2011 | |
| WO | 2012/063785 A | | 5/2012 | |

OTHER PUBLICATIONS

Combined Search and Examination Report of GB1320102.5 dated Dec. 10, 2013.

* cited by examiner

*Primary Examiner* — Humera Sheikh
*Assistant Examiner* — Seth Dumbris
(74) *Attorney, Agent, or Firm* — Browdy and Neimark, PLLC

(57) ABSTRACT

A multi-layer slide member has a back metal layer mainly composed of a steel plate and a porous layer having a metallic porous member and a resin composition filled in the metallic porous member. The metallic porous member has granular portions and narrow portions and includes a structure, in which the granular portions are connected with each other through the narrow portion. Parts or the entirety of the narrow portions have a Bi phase and a Sn—Ni—Cu intermetallic compound phase.

5 Claims, 3 Drawing Sheets

FIG. 5

| | Cu (mass%) | Sn (mass%) | Ni (mass%) | Bi (mass%) | Tensile Strength (MPa) | Ratio T of neck portions, in which Bi phase and Sn – Ni – Cu intermetallic compound phase are seen, to entire neck portions | | | | Utility |
|---|---|---|---|---|---|---|---|---|---|---|
| | | | | | | 50<T | 30≤T≤50 | 0<T<30 | T=0 | |
| Embodiment 1 | Rem. | 5.0 | 1.0 | 1.0 | 5.41 | — | — | ● | — | ◎ |
| Embodiment 2 | Rem. | 6.0 | 3.0 | 3.0 | 6.75 | — | ● | — | — | ◎ |
| Embodiment 3 | Rem. | 7.0 | 5.0 | 5.0 | 6.88 | — | ● | — | — | ◎ |
| Embodiment 4 | Rem. | 5.0 | 0.5 | 0.2 | 5.21 | — | — | ● | — | ◎ |
| Embodiment 5 | Rem. | 5.0 | 15.0 | 10.0 | 4.53 | ● | — | — | — | ○ |
| Embodiment 6 | Rem. | 5.0 | 15.0 | 0.2 | 5.65 | — | — | ● | — | ◎ |
| Embodiment 7 | Rem. | 5.0 | 0.5 | 10.0 | 4.75 | ● | — | — | — | ○ |
| Embodiment 8 | Rem. | 2.0 | 20.0 | 15.5 | 3.88 | ● | — | — | — | ○ |
| Embodiment 9 | Rem. | 7.0 | 5.0 | 5.0 | 6.12 | — | ● | — | — | ◎ |
| Embodiment 10 | Rem. | 10.0 | 5.0 | 30.0 | 3.12 | ● | — | — | — | ○ |
| Comparison Example 1 | Rem. | 5.0 | 2.0 | 0 | 1.73 | — | — | — | ● | × |
| Comparison Example 2 | Rem. | 20.0 | 0 | 0 | 1.62 | — | — | — | ● | × |
| Comparison Example 3 | Rem. | 0 | 15.0 | 5.0 | 1.86 | — | — | — | ● | × |

Multi-LAYER SLIDE MEMBER

CROSS REFERENCE TO RELATED APPLICATIONS

This application claims priority based on Japanese patent application No. 2012-251904 filed Nov. 16, 2012, entirety of which is incorporated herein by reference.

TECHNICAL FIELD

The present invention relates to improvement of a multi-layer slide member.

BACKGROUND

Conventionally, as a cylindrical metal member used as a bush, there has been proposed a multi-layer slide member having a back metal layer consisting of, for example, a cylindrical steel plate and a porous layer formed on a surface of the back metal layer.

The porous layer is a structure made by filling a metallic porous member with a resin composition. In the case of a bush used for automobile parts, the metallic porous member is often made of a copper alloy. There is a case where lubricating oil contains a sulfur ingredient. The sulfur ingredient can corrode the metallic porous member made of the copper alloy and deteriorates durability of the metallic porous member.

Therefore, the material (copper (Cu)—tin (Sn) alloy) of the metallic porous member is impregnated with 21 to 35 mass % of nickel (Ni), thereby improving the corrosion resistance of the metallic porous member (refer to Patent document 1: JP-A-2011-80525).

As prior art documents relating to the present invention, Patent document 2 (JP-A-2001-220630) and Patent document 3 (JP-A-H08-53725) should be also referred to.

The metallic porous member is formed by sintering. Therefore, if high mass % (21 to 35 mass %) of Ni having the higher melting point than Sn and Cu is contained as a raw material of the metallic porous member as in the conventional technology, high sintering temperature is required for forming the metallic porous member. In addition, because Ni is expensive metal, it causes increase of production cost, coupled with the high sintering temperature.

Therefore, the inventors of the present invention have studied hard to provide a multi-layer slide member that has high corrosion resistance regardless of compounded quantity of Ni, or from another viewpoint.

SUMMARY

In order to solve the problem mentioned above, first, the inventors of the present invention examined causes of lowering of durability of the metallic porous member in the porous layer of the multi-layer slide member.

The inventors paid attention to the structure of the metallic porous member. The metallic porous member is produced by sintering metal powder as a raw material, and the metal powders are joined with each other while maintaining original shapes. Therefore, cavities are formed between portions of the metal powders maintaining the original shapes (referred to as granular portions herein) or secondary granules of the granular portions. Thus, a porous structure is produced. Such the metallic porous member includes a structure, in which the granular portions are connected with each other through a portion having a small diameter (referred to as constriction or narrow portion herein).

The inventors thought that the narrow portion having the small diameter greatly affects the durability of the metallic porous member. In other words, the inventors thought that the corrosion resistance of the metallic porous member against the sulfur ingredient will be improved as a whole by improving the corrosion resistance of the narrow portion selectively, even without compounding large quantity of expensive Ni as in the conventional technology.

As a result of further zealous study, the inventors succeeded in precipitating a bismuth (Bi) phase and a Sn—Ni—Cu intermetallic compound phase, both of which have excellent corrosion resistance, specifically in the position of the narrow portion and completed the present invention.

A first aspect of the present invention is defined as follows.

That is, a multi-layer slide member according to a first aspect of the present invention has a back metal layer mainly composed of a steel plate, and a porous layer having a metallic porous member and a resin composition filled in the metallic porous member.

The metallic porous member has granular portions and narrow portions and includes a structure, in which the granular portions are connected with each other through the narrow portion.

A part or entirety of the narrow portions have a Bi phase and a Sn—Ni—Cu intermetallic compound phase.

In the thus-defined multi-layer slide member according to the first aspect of the present invention, the Bi phase and the Sn—Ni—Cu intermetallic compound phase having excellent corrosion resistance against the sulfur ingredient exist in the narrow portion. Therefore, the corrosion resistance of the narrow portion improves.

The narrow portion is smaller in diameter or thinner than other portions (granular portions and the like) in the metallic porous member. In the narrow portion, mechanical strength is difficult to obtain, and thinning proceeds once the corrosion occurs, thereby largely affecting the mechanical strength.

If the corrosion resistance of the narrow portion improves, the corrosion resistance of the metallic porous member containing Cu as the main ingredient improves as a whole. As a result, the durability improves.

In the above, existence of the Bi phase and the Sn—Ni—Cu intermetallic compound phase in other portions than the narrow portion is not denied. Examination by the inventors revealed that distribution of these phases specifically to the narrow portion in the structure, in which the granular portions are connected by the narrow portion, can be facilitated by controlling cooling speed.

That is, even if compounding quantities of corrosion-resistant raw materials such as Bi and Ni are restricted, the corrosion resistance of the metallic porous member can be improved by precipitating the Bi phase and the Sn—Ni—Cu intermetallic compound phase specifically in the narrow portion.

BRIEF DESCRIPTION OF DRAWINGS

These and other objectives and technical advantages of the present invention will be apparent from the following description of the exemplary embodiments of the invention in conjunction with the accompanying drawings, in which:

FIG. 5 is a table showing examination results of embodiments of the present invention and comparison examples.

DETAILED DESCRIPTION

Figure 1:
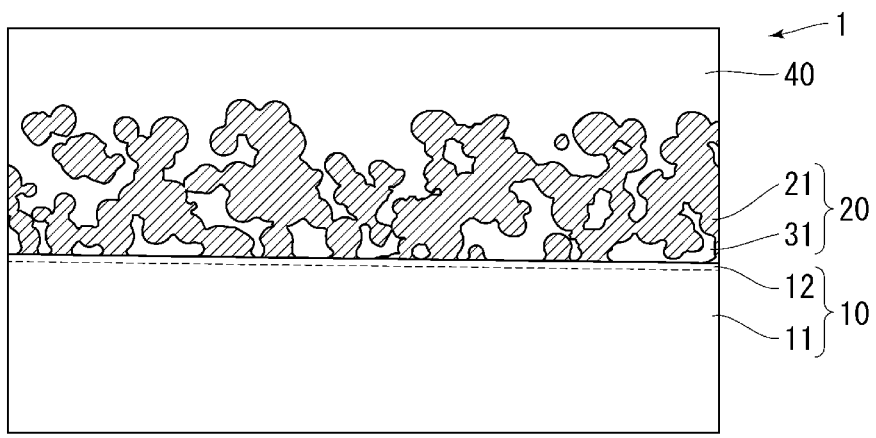
FIG. 1 is a schematic diagram showing a structure of a multi-layer slide member according to the present invention.

FIG. 1 shows a layer construction of a multi-layer slide member 1 according to an embodiment of the present invention.

The multi-layer slide member 1 is a structure, in which a back metal layer 10, a porous layer 20 and a resin layer 40 are stacked in series.

The back metal layer 10 is made of a steel plate 11 formed in a cylindrical shape or a semi-cylindrical shape. A plating layer 12 such as Cu or Ni is provided on a surface (inner peripheral surface) of the steel plate 11 as needed.

The porous layer 20 has a metallic porous member 21 and a resin composition 31 filled in cavities of the metallic porous member 21.

The metallic porous member 21 is produced by sintering metal powder as a raw material. The metal powder keeps its original shape and constitutes a granular portion.

As shown in FIG. 1, cavities are formed among primary granules and secondary granules of the granular portion and the resin composition is filled in the cavities.

Figure 2:
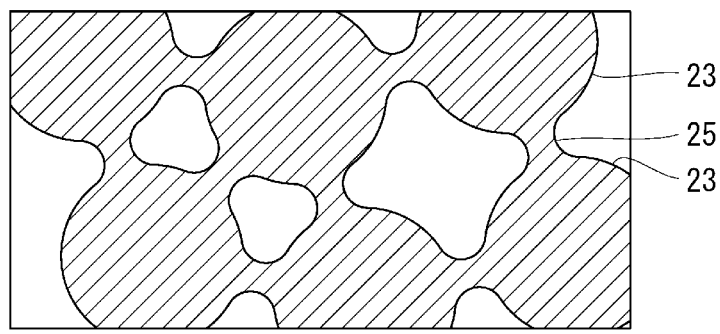
FIG. 2 is a partial enlarged diagram showing a structure of a metallic porous member.

Close observation of the metallic porous member 21 revealed existence of a narrow portion 25 as a structure, in which the granular portions 23, 23 are connected through a small-diameter portion, as shown in FIG. 2.

Figure 3:
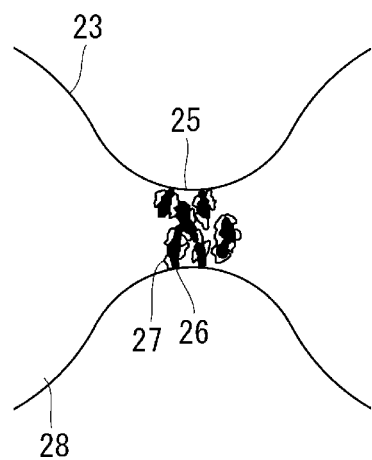
FIG. 3 is a partial enlarged diagram showing a precipitation state of a Bi phase and a Sn—Ni—Cu intermetallic compound phase in a narrow portion.

FIG. 3 shows a state of precipitation of a Bi phase 26 and a Sn—Ni—Cu intermetallic compound phase 27 in the narrow portion 25. Reference numeral 28 in FIG. 3 shows a Cu—Sn—Ni solid solution phase.

That is, the multi-layer slide member 1 according to the present embodiment includes a structure, in which the granular portions 23, 23 are connected by the narrow portion 25, in the metallic porous member 21. A part or entirety of the narrow portion 25 have the Bi phase 26 and the Sn—Ni—Cu intermetallic compound phase 27 as shown in FIG. 3.

The narrow portion 25 satisfying following relationships (i) and (ii) is defined as a neck portion 125 herein.

$$3X \leq x \quad (i)$$

$$2 \leq \phi_1/\phi_2 \leq 5 \quad (ii)$$

In the above, $\phi_1$ is a diameter of the granular portion 23, $\phi_2$ is a diameter of the narrow portion 25 connecting the granular portions 23, 23, $X=1/R$ is a curvature of the granular portion 23 (R: curvature radius of granular portion 23), and $x=1/r$ is a curvature of the narrow portion 25 on an outer peripheral side (r: curvature radius of narrow portion 25 on outer peripheral side).

Figure 4:
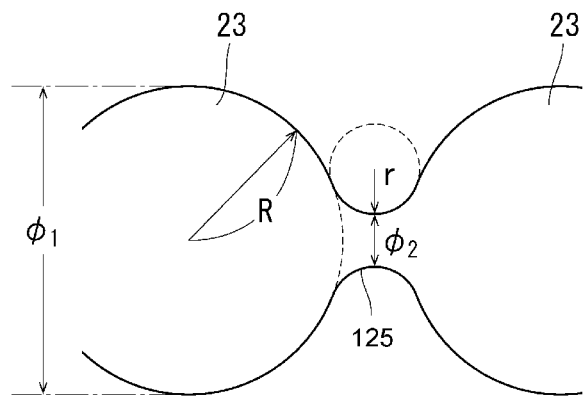
FIG. 4 is a schematic diagram illustrating definition of a neck portion among the narrow portions.

As shown in FIG. 4, $\phi_2$ is the shortest distance between two outer peripheries of the narrow portion 25 connecting the granular portions 23, 23 in an observation viewing field.

The inventors also found it effective to control the thus-defined neck portion 125 in order to improve corrosion resistance of the multi-layer slide member 1.

That is, it is desirable that the Bi phase 26 and the Sn—Ni—Cu intermetallic compound phase 27 precipitate in 30% to 50% of the entire neck portions 125.

There is also a case where the Bi phase 26 and the Sn—Ni—Cu intermetallic compound phase 27 precipitate specifically in the narrow portion 25 not satisfying the above-mentioned conditions (i) and (ii) (e.g., narrow portion 25 thicker than standard of neck portion 125). Also in such the case, the corrosion resistance of the portion improves.

It is desirable that 40% of the entire narrow portions 25 or more are the neck portions 125 from a viewpoint of manufacturing of the multi-layer slide member 1 according to the present embodiment. It is more desirable that 60% of the entire narrow portions 25 or more are the neck portions 125 from a viewpoint of stability of connection between the metallic porous member 21 and the resin composition 31.

The entire compositions of the metallic porous member 21 may be 2.0-10.0 mass % of Sn, 0.5-15.0 mass % of Ni, 0.2-30.0 mass % of Bi, and Cu as substantially the remaining portion. Thus, mechanical durability required of a bush as an automobile part can be improved, and the Bi phase and the Sn—Ni—Cu intermetallic compound phase can be stably distributed specifically to the narrow portion 25, for example.

Desirable ranges of the compositions of the metallic porous member 21 are 3.0-10.0 mass % of Sn, 0.5-15.0 mass % of Ni, 0.2-15.0 mass % of Bi, and Cu as substantially the remaining portion. There is a possibility that the mechanical strength of the metallic porous member 21 deteriorates due to fragility of Bi if Bi exceeds 15.0 mass %. When Bi is less than 0.2 mass %, there is a possibility that stable precipitation of the Bi phase and the Sn—Ni—Cu intermetallic compound phase in the narrow portion 25 becomes more difficult as the quantity of Bi decreases.

For use in a severer environment, Sn may be 4.0-8.0 mass %, Ni may be 2.0-10.0 mass %, Bi may be 1.5-9.0 mass %, and the remaining portion may be substantially Cu. For use in a much severer environment, Sn may be 5.5-7.5 mass %, Ni may be 2.5-6.0 mass %, Bi may be 2.0-7.0 mass %, and the remaining portion may be substantially Cu.

There is a case where minor constituents such as P (phosphorus), Fe (iron), Zn (zinc), Al (aluminum), Co (cobalt) and Sb (antimony) are contained in the metallic porous member 21 such that the total quantity of the minor constituents is 1 mass % or less (for example, P: 0.1-0.5 mass % contained). It is thought that such the minor constituents are contained in the raw material metal powder or are mixed during the manufacturing process. Even if such the mixture is accidental or intentional, such the mixture is anticipated from the beginning and is included in the technological scope of the present invention.

The resin composition 31 filled in the cavities of the metallic porous member 21 can be selected arbitrarily in accordance with use conditions or use of the multi-layer slide member 1 or the like. For example, one kind or plural kinds of following resins can be employed.

Fluorocarbon polymer (polytetrafluoroethylene resin or the like), polyacetal resin, polyamide resin, polyphenylene sulfide resin, polyimide resin, polyamide-imide resin, polyether sulfone resin, polyetheretherketone resin, phenolic resin, and epoxy resin.

Polytetrafluoroethylene resin, polyacetal resin, polyamide resin, and polyetheretherketone resin are specifically preferable from a viewpoint of sliding performance. Additive such as solid lubricant (e.g., molybdenum disulfide) may be mixed in the above-mentioned resin.

The material of the resin layer 40, which is stacked on the surface of the porous layer 20, may be also selected arbitrarily in accordance with the use conditions or the use of the multi-layer slide member 1 or the like. It is preferable that the same material as the resin composition 31 is used as the material of the resin layer 40 from a viewpoint of maintaining the connection strength therebetween and a viewpoint of facilitating the manufacturing process.

The material of the resin layer 40 may be a body different from the material of the resin composition 31. Alternatively, the resin layer 40 may be omitted. When the resin layer 40 is omitted, the surface (inner peripheral surface) of the multi-layer slide member 1 is the porous layer 20.

Next, a manufacturing method of the multi-layer slide member 1 will be explained.

First, metal powder is prepared using ingredients of Sn, Ni, Bi and Cu, and other ingredients in accordance with use. It is desirable that the metal powder contains 3.0-10.0 mass % of Sn, 0.5-15.0 mass % of Ni, 0.2-15.0 mass % of Bi, and Cu as substantially the remaining portion. In this case, it is preferable that the grain size of the metal powder is 250 μm or smaller. The above-mentioned metal powder is not limited to the metal powder of one kind of alloyed metal powder of the aimed composition. Alternatively, the metal powder may be a mixture of metal powders of different compositions as long as the above-mentioned composition is provided as a whole (for example, metal powder may be mixture of alloy powder composed of Cu—Sn—Ni and Bi powder).

For example, the metal powder of the alloy consisting of the above-mentioned ingredients is dispersed uniformly on a steel plate, on which copper plating is applied. Then, sintering is performed in a reductive atmosphere in a temperature range of 800-950 degrees Celsius to form the metallic porous member 21.

Heat is added in the sintering process to bring Bi in the metal powder into a liquid phase. Sn, Ni and the like spread into Bi, which has become liquid and which has come to have a high solid solubility limit, from the circumference. Due to surface tension, Bi aggregates between the granular portions 23, 23 maintaining the solid phase in the metal powder.

Temperature is lowered in a cooling process to disperse Sn, Ni and the like, which have been dissolved in Bi in the liquid phase, into the adjacent solid phase part. Therefore, it is though that Sn, Ni and the like concentrate near an interface between the Bi phase and the phase mainly containing Cu (Cu—Sn—Ni solid solution phase) and that the Sn—Ni—Cu intermetallic compound phase precipitate to surround the Bi phase.

In the above, the surface tension acts on the liquid phase materials aggregating between the granular portions 23, and an outer peripheral surface of the materials becomes like a curved surface and takes the shape of a "narrow form." The Bi phase and the Sn—Ni—Cu intermetallic compound phase precipitate in the narrow portion. In the present embodiment, cooling is performed in the cooling process by controlling speed of the cooling from 800 to 450 degrees Celsius at 35-90 degrees Celsius/m.

Thereafter, the resin composition 31 is impregnated into the metallic porous member 21 to form the multi-layer slide member 1.

At that time, the resin layer 40 can be formed on the metallic porous member 21 by adjusting the impregnation quantity of the resin composition 31. Then, the surface is finished by rolling.

The thus-obtained product is cut into a predetermined width and a predetermined length and is bent into a shape having a circular cross-section. Thus, a cylindrical multi-layer slide member 1 is manufactured. The multi-layer slide member 1 is suitably used as a bush for a fuel injection pump, a compressor and the like.

In accordance with the above manufacturing method, as a resin composition, the inventors selected polytetrafluoroethylene resin (640-J by Du Pont-Mitsui Fluorochemicals Co., Ltd.) in embodiments 1-8, 10 and comparison examples 1-3 and selected polyacetal resin (AW-01 by Polyplastics Co., Ltd.) in embodiment 9. Thus, the inventors produced the multi-layer slide members of the embodiments and the comparison examples defined in a table shown in FIG. 5. Quantity of P (phosphorus) of the metallic porous member 21 of the multi-layer slide member of each of the embodiments and the comparison examples was approximately 0.3 mass %. It has been confirmed that such the quantity of P does not affect examination explained later. Thickness of the steel plate 11 is 1.2 mm, and thickness of the copper plating layer 12 is 5 μm in the back metal layer 10. Thickness of the porous layer 20 is 0.3 mm, and thickness of the resin layer 40 is 10 μm.

The multi-layer slide member of each of the embodiments and the comparison examples was cut along a thickness direction, and a cut section was observed with an optical microscope. FIG. 1 is an illustration schematically showing the observation result.

According to the result of the observation, existence of a structure, in which the granular portions are connected by the narrow portion, was confirmed.

In addition, existence of the Bi phase, the Sn—Ni—Cu intermetallic compound phase and the like was identified by comparing the observation result using the optical microscope and an analysis result using an electron probe micro analyzer about the metallic porous member 21.

Based on the above finding, the metallic porous member 21 was observed using the optical microscope (observation viewing field: 1 mm×1 mm) to determine a ratio of the neck portions 125, in which the Bi phase and the Sn—Ni—Cu intermetallic compound phase were seen, to the total number of the neck portions 125 corresponding to the above definition among the narrow portions 25.

The result is shown in the table of FIG. 5. In the column of utility in the table, double circle mark indicates "very favorable", circle mark indicates "favorable", and x means "low." "Rem." in the table means the remaining portion. The table shows the results of the examination using the multi-layer slide member 1, in which approximately 50% of the entire narrow portions 25 are the neck portions 125, for each of the embodiments and the comparison examples.

A specimen cut out of the multi-layer slide member of each of the embodiments and the comparison examples was immersed in polar oil (sulfur-added oil), which was heated to 120 degrees Celsius, for 1,000 hours. Then, the specimen was taken out and cleaned.

Tensile strength test of the specimen that has completed the immersion into the oil was performed as follows.

An end of a joining pin is adhered to the resin layer of the specimen of each of the embodiments and the comparison examples, which is fixed onto a test table, using a thermosetting resin and the other end of the joining pin is pulled. If the pulling power is increased gradually, the multi-layer slide member breaks and a piece of the specimen adhered to the pin leaves the specimen. The pulling power at that time is assumed as the tensile strength. The results are shown in the table of FIG. 5.

As shown in the table of FIG. 5, the tensile strength is 3.00 MPa or higher in all the embodiments 1-10, and all of them are thought to be workable.

On the other hand, each of the comparison examples 1-3 does not have the narrow portion that has the Bi phase and the Sn—Ni—Cu intermetallic compound phase, and the tensile strength did not reach 3.00 MPa.

It is thought that, in the latter cases, the narrow portion is subject to corrosion, and the power applied by the tensile strength test concentrates in the weakened narrow portion, thereby leading to collapse of the metallic porous member.

Although not shown in the table of FIG. 5, it was also found that the tensile strength lowers if Ag (silver) is added.

Among the embodiments 1-10, the embodiments 1-7 and 9, whose content of Bi is 15.0 mass % or lower, show excellent tensile strength of 4.00 MPa or higher. Therefore, it is preferable to set the content of Bi at 0.2 to 15.0 mass %.

Also, it is thought that more preferable content of Bi is in the range of 2.0-7.0 mass % from the results of the embodiment 2 (Bi: 3.0 mass %), the embodiment 3 (Bi: 5.0 mass %) and the embodiment 9 (Bi: 5.0 mass %).

The embodiment 5 contains 15.0 mass % of Ni whereas the embodiment 7 contains only 0.5 mass % of Ni. However, comparison between the embodiments 5 and 7 shows that the embodiment 7 achieves the tensile strength similar to that of the embodiment 5. Thus, it is understood that excellent tensile strength can be obtained even if the content of Ni is reduced.

From the results of the embodiments 1-10, it is understood that it is specifically preferable to set the ratio T of the neck portions 125, in which the Bi phase and the Sn—Ni—Cu intermetallic compound phase are seen, to the entire neck portions 125 in the range from 30% to 50%.

The present invention is not limited to the above explanation of the embodiments. Various modifications that can be easily thought of by a person skilled in the art without departing from the scope of description of claims are included in the present invention.

What is claimed is:

1. A multi-layer slide member comprising:
a back metal layer mainly composed of a steel plate; and
a porous layer having a metallic porous member and a resin composition filled in the metallic porous member, wherein
the metallic porous member has granular portions and narrow portions and includes a structure, in which the granular portions are connected with each other through the narrow portion, and
a part or entirety of the narrow portions have a Bi phase and a Sn—Ni—Cu intermetallic compound phase,
the narrow portion satisfying following relationships:

$$3X \leq x; \text{ and} \quad \text{(i)}$$

$$2 \leq \phi 1/\phi 2 \leq 5 \quad \text{(ii)}$$

is defined as a neck portion, where X is a curvature of the granular portion, x is a curvature of the narrow portion, $\phi 1$ is a diameter of the granular portion, and $\phi 2$ is a diameter of the narrow portion,
the Bi phase and the Sn—Ni—Cu intermetallic compound phase precipitate in 30% to 50% of the entire neck portions, and
the metallic porous member does not contain Ag.

2. The multi-layer slide member as in claim 1, wherein the metallic porous member contains 3.0-10.0 mass % of Sn, 0.5-15.0 mass % of Ni, 0.2-15.0 mass % of Bi, and Cu as substantially the remaining portion.

3. The multi-layer slide member as in claim 2, wherein a compounded quantity of Bi in the metallic porous member is 1.5-9.0 mass %.

4. The multi-layer slide member as in claim 2, wherein a compounded quantity of Bi in the metallic porous member is 2.0-7.0 mass %.

5. The multi-layer slide member as in claim 4, wherein a compounded quantity of Ni in the metallic porous member is 2.0-10.0 mass % or lower.

* * * * *